United States Patent
Wetzel

(10) Patent No.: US 11,920,679 B2
(45) Date of Patent: Mar. 5, 2024

(54) PARKING LOCK DEVICE FOR A VEHICLE TRANSMISSION AND METHOD FOR OPERATING A PARKING LOCK DEVICE

(71) Applicant: Robert Bosch GmbH, Stuttgart (DE)

(72) Inventor: Gerhard Wetzel, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/908,890

(22) PCT Filed: Feb. 9, 2021

(86) PCT No.: PCT/EP2021/053075
§ 371 (c)(1),
(2) Date: Sep. 1, 2022

(87) PCT Pub. No.: WO2021/175541
PCT Pub. Date: Sep. 10, 2021

(65) Prior Publication Data
US 2023/0091687 A1  Mar. 23, 2023

(30) Foreign Application Priority Data
Mar. 3, 2020 (DE) ..................... 10 2020 202 682.3

(51) Int. Cl.
*F16H 63/34* (2006.01)
(52) U.S. Cl.
CPC ..... *F16H 63/3491* (2013.01); *F16H 63/3466* (2013.01); *F16H 63/3475* (2013.01)
(58) Field of Classification Search
CPC ............. F16H 63/3491; F16H 63/3475; F16H 63/3466
See application file for complete search history.

(56) References Cited

U.S. PATENT DOCUMENTS 11,287,037 B2 *  3/2022  Wetzel ................ F16H 63/3491
2014/0060994 A1 *  3/2014  Burgardt ................. F16H 63/18
                                                            192/219.6
(Continued)

FOREIGN PATENT DOCUMENTS

DE          10045953 A1       5/2002
DE          10054977 A1       5/2002
(Continued)

OTHER PUBLICATIONS

Translation of International Search Report for Application No. PCT/EP2021/053075 dated Apr. 16, 2021 (2 pages).

*Primary Examiner* — Stacey A Fluhart
(74) *Attorney, Agent, or Firm* — Michael Best & Friedrich LLP

(57) ABSTRACT

The invention relates to parking brake device (10) for a vehicle transmission (GT) comprising a driveshaft (AW) and a first actuator (F1), via which the driveshaft (AW) can be rotated; a pawl (2), which can be lockingly engaged in the vehicle transmission (GT); a rotary mechanism (1), which is connected to the driveshaft (AW) and comprises an engaging mechanism, an insert spring (16) and a permanent magnet (PM), wherein the pawl (2) and the rotary mechanism (1) can be moved with the permanent magnet (PM) between a locking position (P) and a neutral position (nP) for the vehicle transmission (GT), wherein the rotary mechanism (1) can be pretensioned via the insert spring (16) and the neutral position (nP) can be adopted; wherein the parking brake device (10) also comprises: a second actuator (F2), via which the engaging mechanism can be triggered when the insert spring (16) is pretensioned and, as a result, the locking position (P) can be entered via an application of force of the insert spring (16) on the rotary mechanism.

12 Claims, 10 Drawing Sheets

(56) References Cited

U.S. PATENT DOCUMENTS

| | | | | |
|---|---|---|---|---|
| 2017/0130839 A1* | 5/2017 | Takei | ...................... | B60T 1/005 |
| 2018/0154881 A1* | 6/2018 | Heubner | ................. | F16D 65/14 |
| 2018/0172155 A1* | 6/2018 | Spratte | ................ | F16H 63/3466 |
| 2020/0040993 A1* | 2/2020 | Gebert | ................ | F16H 63/3491 |
| 2021/0197771 A1* | 7/2021 | Frister | .................. | F16D 63/006 |

FOREIGN PATENT DOCUMENTS

| | | | | |
|---|---|---|---|---|
| DE | 102014211390 A1 * | 12/2015 | ......... | F16H 63/3425 |
| DE | 102014211390 A1 | 12/2015 | | |
| DE | 102016015728 A1 * | 10/2017 | | |
| EP | 2916045 A1 | 9/2015 | | |

* cited by examiner

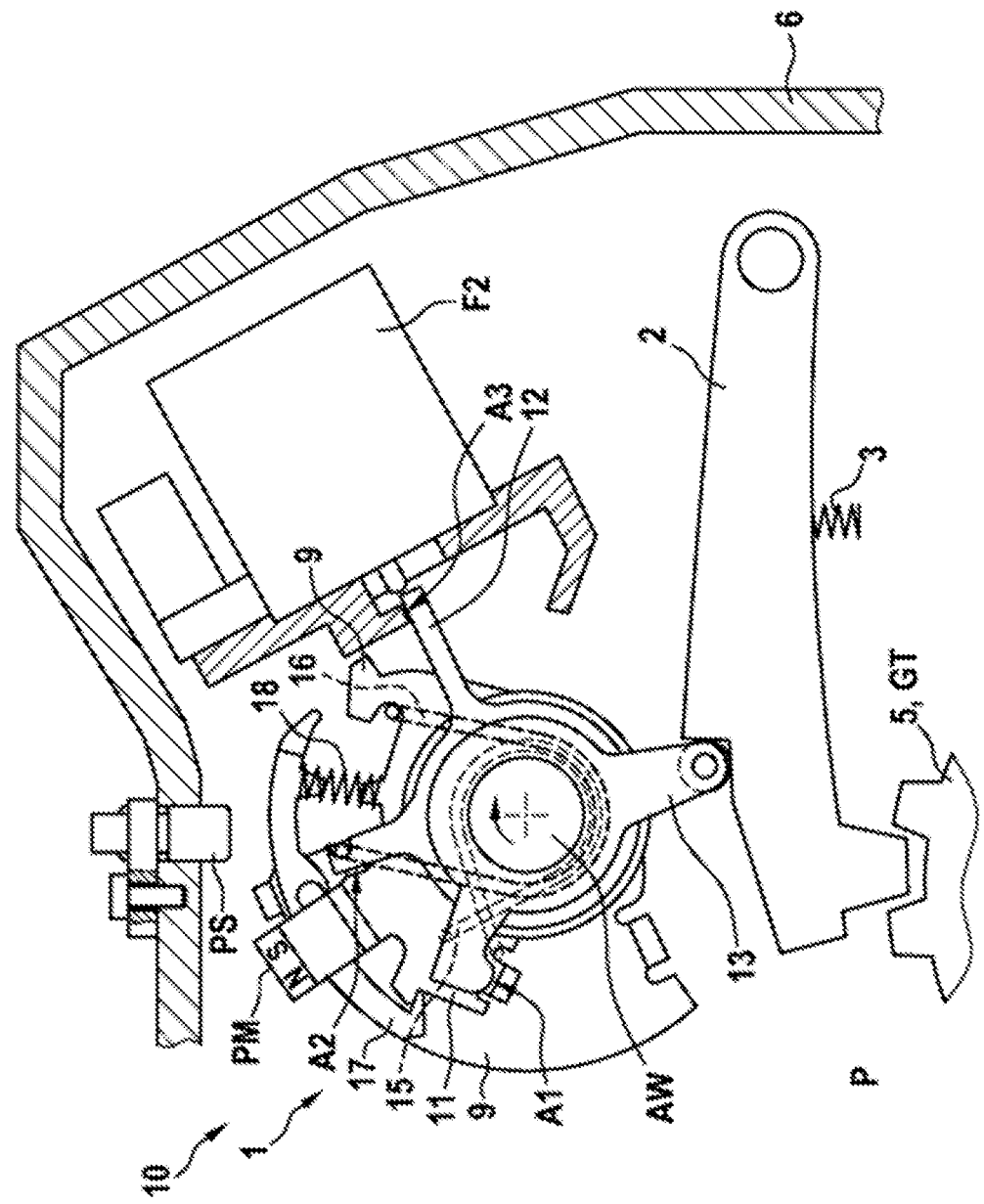

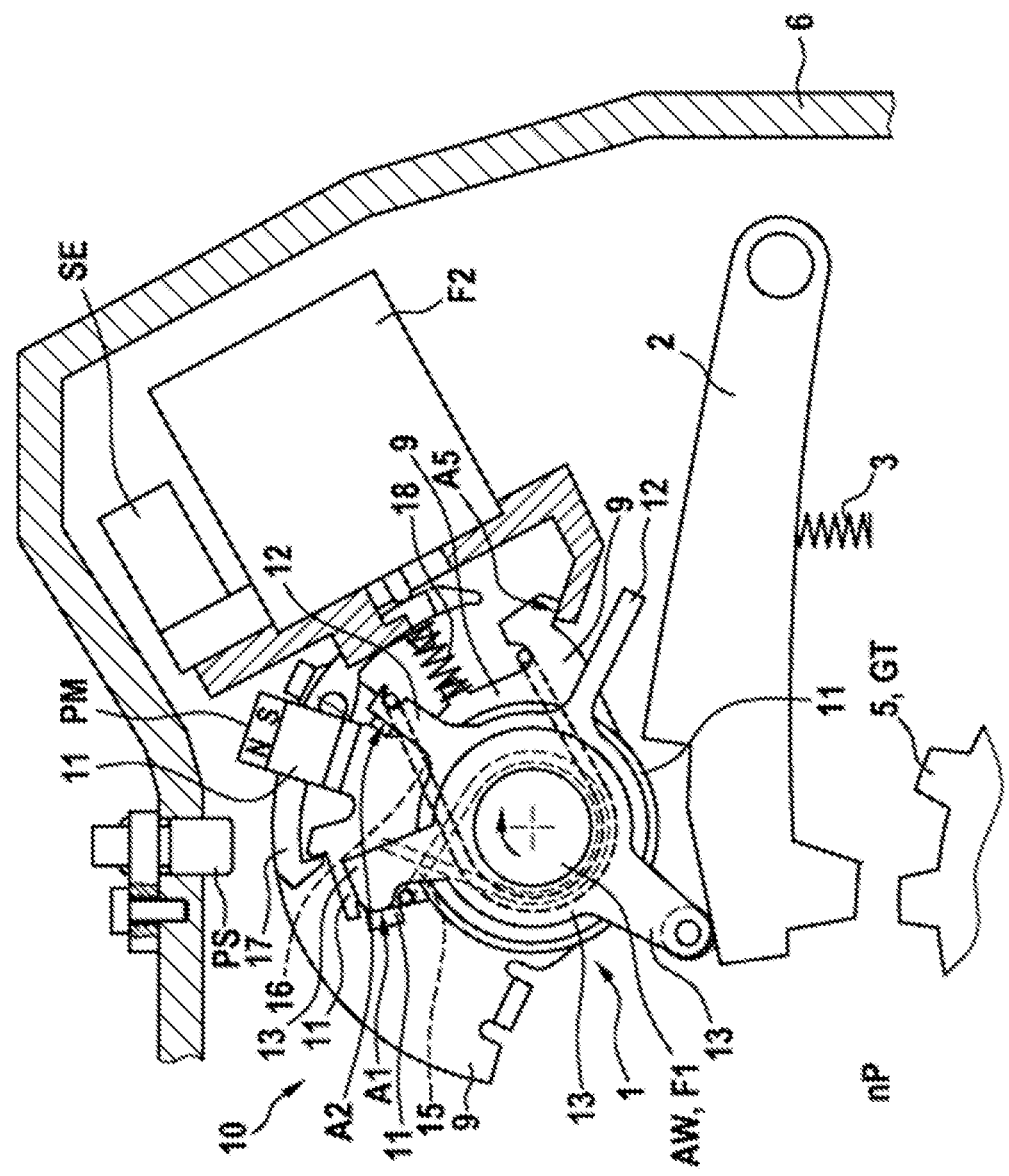

PARKING LOCK DEVICE FOR A VEHICLE TRANSMISSION AND METHOD FOR OPERATING A PARKING LOCK DEVICE

BACKGROUND

The present invention relates to a parking lock device for a vehicle transmission and to a method for operating a parking lock device.

Known parking locks can be used in transmissions, for example in automatic transmissions, in order to reduce or avoid the risk of the vehicle rolling away accidentally. Such parking locks can be actuated hydraulically since such transmissions can usually have a hydraulic pressure supply. Since, as a rule, no hydraulic pressure supply is available in electric drive units, an electromechanical actuation system which is as loss-free as possible may be preferred. The functioning of the parking lock should have a high functional reliability, for which purpose redundant actuation is also desirable. In addition, any safety offered in this regard can be further increased by redundant actuation using a separate energy supply, for example by means of charged capacitors.

In known rotationally acting parking locks, the force can be transmitted to the cam disk by rotation of the spindle by means of a spiral spring. If a tooth of the parking lock pawl strikes a tooth of the parking lock wheel during this process, the spiral spring can be stressed and thus the pawl can be engaged after a minimum rotation of the parking lock wheel, e.g. after movement of the vehicle.

DE 10 2014 211 390 A1 describes a parking lock which can have an electric motor and a solenoid as redundant actuators. In this case, the solenoid can be provided purely as an emergency actuator.

SUMMARY

The present invention provides a parking lock device for a vehicle transmission and a method for operating a parking lock device.

The concept on which the present invention is based consists in specifying a parking lock device for a vehicle transmission and a method for operating a parking lock device in which electromechanical actuation thereof can take place. The parking lock device can be designed as a compact and easily assembled subassembly. Through the action of both actuators, a function test of the actuators and of the rotary mechanism can be carried out automatically during operation, and a first actuator can also take over the role of the second actuator in order to trigger the engagement of the locking effect (position) if the latter has a malfunction.

Furthermore, the rotational position and the resulting locking position or neutral position and any intermediate positions can be easily detected by a sensor.

According to the invention, the parking lock device for a vehicle transmission comprises a drive shaft and a first actuator, by which the drive shaft can be rotated; a locking pawl, which can be latched into the vehicle transmission with a locking effect; a rotary mechanism, which is connected to the drive shaft and comprises a latching mechanism, an engagement spring and a permanent magnet, wherein the locking pawl and the rotary mechanism can be moved with the permanent magnet between a locking position and a neutral position for the vehicle transmission, wherein the rotary mechanism can be preloaded by means of the engagement spring and, as a result, the neutral position can be adopted; wherein the parking lock device further comprises a second actuator, by which, when the engagement spring is preloaded, the latching mechanism can be triggered and, as a result, the locking position can be selected by a force effect of the engagement spring on the rotary mechanism, wherein, when the engagement spring is preloaded, the rotary mechanism can be held in the neutral position by the engaged latching mechanism, and wherein the first actuator is furthermore designed to move the rotary mechanism, preferably while retaining the locking position until the starting position is reached, and thereby load the engagement spring again and, after that, to move the rotary mechanism into the neutral position. The parking lock device further comprises a position sensor, which is arranged in a detection region of the permanent magnet, wherein the position sensor is configured to detect a movement of the permanent magnet relative to the position sensor and to ascertain whether the locking pawl is in the locking position or in the neutral position on account of the rotary mechanism; and a control device, which is connected to the position sensor and to the first actuator and to the second actuator, and which is configured to control operation of the first actuator and/or of the second actuator.

By means of the two actuators, the parking lock device is advantageously actuated electromechanically.

The locking pawl can be preloaded by means of a pawl spring, wherein the pawl spring can exert a permanent moment on the locking pawl and can always push the locking pawl out or away from a gear mechanism of the vehicle transmission. In order to achieve the locking effect, the moment of the pawl spring has to be overcome and counteracted, preferably by a cam disk of the rotary mechanism, which can have an extension arm that can rest against the locking pawl and, depending on the rotary position of the rotary mechanism, can push the locking pawl in the direction of the gear mechanism of the vehicle transmission and, in the process, can overcome the moment of the pawl spring or can allow a movement of the locking pawl out of the gear mechanism.

The latching mechanism can comprise, for example, a latching pawl, which can be connected to a specific disk or element of the rotary mechanism and can be arranged movably on this at least for a latching movement. In certain positions, this latching pawl can latch with another disk or another element of the rotary mechanism and keep at least these two disks or elements in engagement with one another in a manner fixed against movement, within a certain tolerance range or with a permissible play. In this way, parts of the rotary mechanism, for example disks or other elements, can be connected to an engagement spring and, when the spring is preloaded, can be connected to one another in a manner fixed against movement in the abovementioned sense until the latching mechanism is released and the loading force of the engagement spring triggers a movement of the rotary mechanism, as a result of which, for example, a cam disk can move the locking pawl. Thus, the latching mechanism itself can also be supported via the disk so as to be rotatable with respect to the drive shaft.

The engaged parking lock can thus advantageously represent a safe state of the vehicle since unintentional rolling away of the vehicle, for example in a sloping position, can thus be reduced or avoided with a high degree of probability.

For renewed loading of the engagement spring, the first actuator can be used and, for example, can rotate the disk on which the latching mechanism is secured in a loading direction of the engagement spring by means of the movement of the drive shaft.

The position sensor can be arranged on a housing of the vehicle transmission and opposite the movable elements of the rotary mechanism, thus enabling it to detect changes in a magnetic field of a permanent magnet, for example a bar magnet.

The rotary mechanism can be constructed in such a way that all movable parts can be arranged on the drive shaft of the first actuator. It is thereby possible to produce a compact and easily assembled subassembly.

Reverse rotation of the rotary mechanism into the starting position, in which the locking effect can be canceled again, can advantageously take place while the locking effect is still in effect and advantageously directly after the loading of the engagement spring. With the vehicle fixed against rolling away, the disengagement process of the lock can thus take place quickly.

The arrangement of the movable parts of the rotary mechanism on the drive shaft advantageously results in a compact unit of the parking lock device, the possibility of forming a preassembled subassembly and/or of implementing a low-cost design.

According to a preferred embodiment of the parking lock device, the rotary mechanism further comprises a ratchet disk, which is connected to the drive shaft for conjoint rotation therewith. According to this preferred embodiment, the parking lock device comprises a magnetic disk with the permanent magnet, an engagement spring disk, which is connected to the engagement spring, and a cam disk, wherein the magnetic disk, the engagement spring disk and the cam disk are arranged and supported rotatably on the drive shaft, wherein the magnetic disk, the engagement spring disk, the cam disk and/or the ratchet disk comprise stop regions, by means of which a torque can be transmitted via the rotary mechanism, wherein the locking pawl rests on the cam disk and, depending on a position of the cam disk, the locking pawl is in the locking position or in the neutral position for the vehicle transmission.

The latching mechanism can be secured, for example, on the ratchet disk, advantageously being rotatable for latching and unlatching, and can move with the latter about the drive shaft.

The stop regions can be arranged on the said disks or can be part of them in such a way that the disks can be rotated relative to one another until a respective disk strikes one of the stops and transmits a torque to a further one of the disks and takes it along in rotation.

According to a preferred embodiment of the parking lock device, the rotary mechanism comprises a cam spring, by means of which the torque can be transmitted within the rotary mechanism.

The cam spring can be loaded by a disk movement and can be used for a return movement into a starting position of the disks relative to one another. The cam spring can be used as an additional element for transmitting torques within the rotary mechanism and with respect to a transmission housing and/or the locking pawl.

According to a preferred embodiment of the parking lock device, the position sensor is configured to detect a magnetic field characteristic during the movement of the permanent magnet.

The position sensor can be designed in a conventional manner, which can sense the states "parking lock engaged" and "parking lock disengaged". A sensor of this type can also be used here to sense the position from the characteristic curve and thus also to detect if the permanent magnet is at an over-loading position or full loading position of the engagement spring, which can differ from the "parking lock engaged" or "parking lock disengaged" position or can divide it into subregions. By using a single sensor, effort, as well as installation space and costs, can be reduced and a functional reliability can be increased.

According to a preferred embodiment of the parking lock device, the first actuator comprises an electric motor and the second actuator comprises a solenoid.

According to a preferred embodiment of the parking lock device, the rotary mechanism is designed to engage with at least one further stop region of a housing of the vehicle transmission in order to transmit a torque via the rotary mechanism.

According to a preferred embodiment of the parking lock device, the control device is configured to detect an error function of the second actuator and to actuate the first actuator to trigger the latching mechanism or the first actuator to rotate the drive shaft and thus to select the locking position.

The second actuator can be designed as a solenoid, which can comprise an armature stroke and can thus trigger the latching of the latching mechanism. This latching can then release the engagement spring, which can permit engagement of the parking lock in normal operation and in the event of a malfunction of the second actuator, for example when the latching mechanism is triggered by the first actuator. Since the first actuator can load the engagement spring again after the parking lock has been engaged, a functional test on both actuators can thereby be provided in normal operation.

A test routine to check the functioning of the second actuator from time to time can thereby be avoided. As a result of this automatic function test, the behavior of the parking lock in normal operation and in test operation can always leave the same impression for the driver of the vehicle or for other users. If, on the other hand, this were to be perceptible in a different way through an extra test routine with other actuators, a user (driver) could be brought to suspect a malfunction and unnecessarily visit a repair garage.

A malfunction of the second actuator can advantageously be detected if the latching mechanism and the engagement of the locking effect is not triggered within a predetermined time after a command for engagement of the locking effect has been given by a user or automatically by the control device. The control device can issue such a triggering command at the request of a user or automatically, for example if further sensors indicate a need for this, for instance at the start of unwanted downhill rolling of the vehicle. A malfunction of the second actuator can be, for example, a break in the electrical contact, a cable break, a short circuit to ground, a winding short circuit, or some other. Owing to the fact that, in the event of a failure of the second actuator, the first actuator can also trigger the latching mechanism or can rotate the rotary mechanism into the locking position with the engagement spring relaxed, there is advantageously a redundancy for the engagement of the parking lock.

The functional test can advantageously already be carried out in that it can be ascertained whether, within a predetermined period of time after a command has been given for the engagement or disengagement of the locking effect and/or the preloading of the spring, this effect has also occurred.

In the case of conventional parking locks, a separate function test or no function test is usually provided for the use of different actuators, and therefore the handling of such a parking lock may be more complicated or it may function only partially, without it being possible to acquire information about functioning.

In order to engage the locking effect, the first actuator can rotate the rotary mechanism, for example the ratchet disk, as a result of which the engagement spring can be relaxed in the same way as when the latching mechanism is triggered by the second actuator. The state of the rotary mechanism after this step of the first actuator as a redundant trigger mechanism can advantageously correspond in the end position of the disks to that as if the second actuator had properly released the engagement spring.

According to a preferred embodiment of the parking lock device, the rotary mechanism is designed in such a way that, when the rotary mechanism is moved in order to load the engagement spring again and the rotary mechanism is subsequently moved into the neutral position, the locking pawl maintains a locking effect until the neutral position is reached.

According to a preferred embodiment of the parking lock device, said device comprises an emergency power supply, to which the first actuator and/or the second actuator are/is connected.

The second actuator can be supplied with power both via the normal on-board power supply and via an emergency supply. Such an emergency supply as an emergency power supply in the vehicle can be formed, for example, by means of a second battery or supercaps (supercapacitors), which can ensure, in the event of failure of the normal on-board power supply, that the vehicle can be transferred to a safe state when the locking effect begins. This can correspond to a redundant power supply.

According to the invention, in the method for operating a parking lock device according to the invention, there is triggering of the latching mechanism by the second actuator or by the first actuator in the event of a malfunction of the second actuator and thereby engagement of the locking position by a force effect of the engagement spring or rotation of the drive shaft by the first actuator and thereby engagement of the locking position by the first actuator in the event of a malfunction of the second actuator, the engagement spring also relaxing in the event of such a movement. This is then followed by renewed loading of the engagement spring by rotation of the rotary mechanism by the first actuator during the locking position and engagement of the latching mechanism; and movement of the rotary mechanism back into the neutral position by the first actuator, wherein the position sensor detects, preferably continuously, a movement of the permanent magnet relative to the position sensor and ascertains whether the locking pawl is in the locking position or in the neutral position on account of the rotary mechanism.

According to a preferred embodiment of the method, the second actuator performs a stroke and thus releases the latching mechanism and, as a result, enables rotation of the rotary mechanism by the force effect of the preloaded engagement spring (16) and, as a result, engages the locking position.

According to a preferred embodiment of the method, in order to load the engagement spring, the rotary mechanism is rotated as far as a loading position, which is detected by the position sensor.

The method can advantageously also be distinguished by the features mentioned in conjunction with the parking lock device and vice versa.

BRIEF DESCRIPTION OF THE DRAWINGS

Further features and advantages of embodiments of the invention will be found in the following description with reference to the accompanying drawings.

The present invention is explained in greater detail below with reference to the exemplary embodiment indicated in the schematic figures of the drawing.

In the drawing:

FIG. 1 shows a schematic illustration of a rotary mechanism in a parking lock device according to one exemplary embodiment of the present invention during an operating step;

FIG. 2 shows a schematic illustration of a rotary mechanism in a parking lock device according to one exemplary embodiment of the present invention during a further operating step;

FIG. 3 shows a schematic illustration of a rotary mechanism in a parking lock device according to one exemplary embodiment of the present invention during a further operating step;

FIG. 4 shows a schematic illustration of a rotary mechanism in a parking lock device according to one exemplary embodiment of the present invention during a further operating step;

FIG. 5 shows a schematic illustration of a rotary mechanism in a parking lock device according to one exemplary embodiment of the present invention during a further operating step;

FIG. 6 shows a schematic illustration of a rotary mechanism in a parking lock device according to one exemplary embodiment of the present invention during a further operating step;

FIG. 7 shows a schematic illustration of a rotary mechanism in a parking lock device according to one exemplary embodiment of the present invention during a further operating step;

FIG. 8 shows a schematic illustration of a rotary mechanism in a parking lock device according to one exemplary embodiment of the present invention during a further operating step;

FIG. 9 shows a schematic illustration of a rotary mechanism in a parking lock device according to one exemplary embodiment of the present invention during a further operating step; and FIG. 10 shows a schematic illustration of a rotary mechanism in a parking lock device according to one exemplary embodiment of the present invention during a further operating step.

DETAILED DESCRIPTION

In the figures, identical reference signs denote identical or functionally identical elements.

Figure 1:
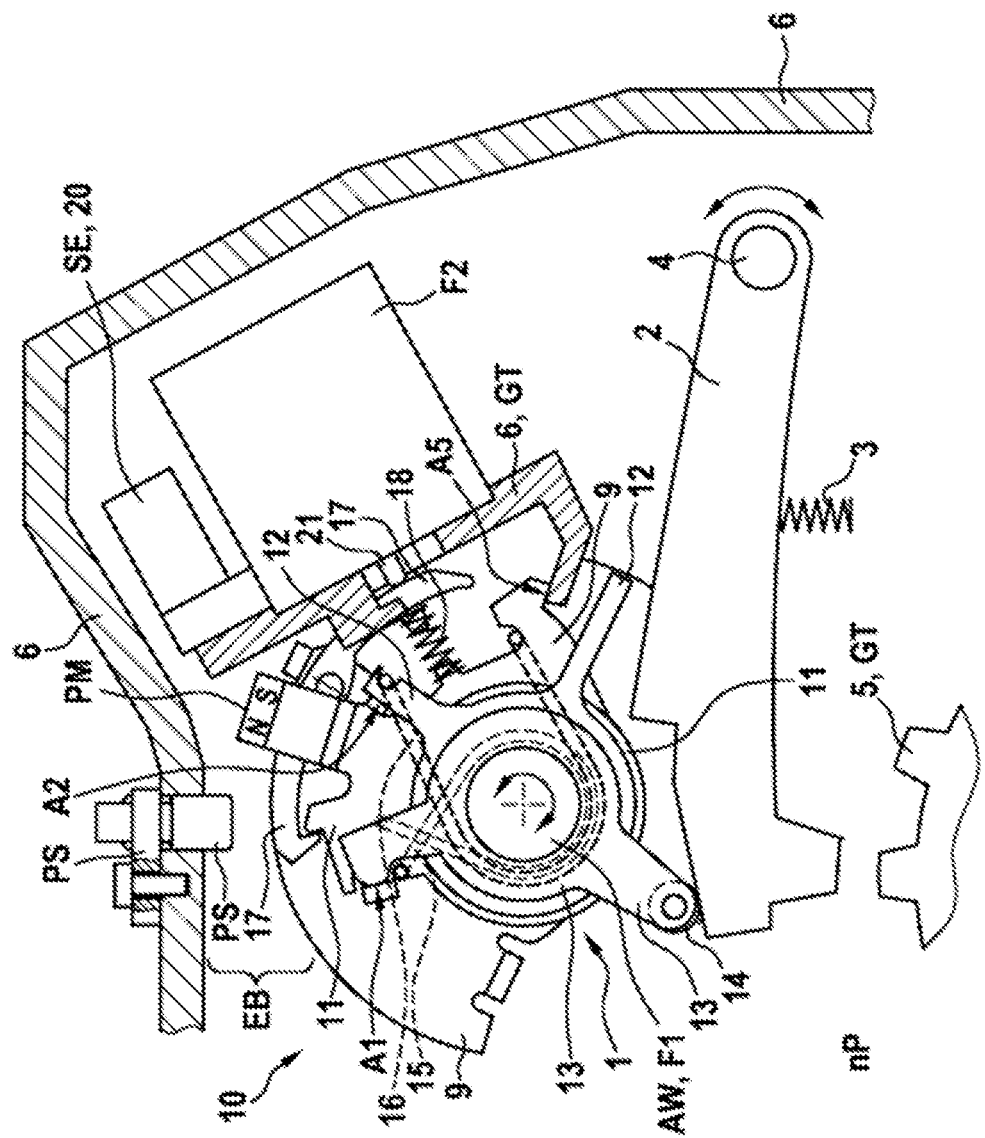

FIG. 1 shows a schematic illustration of a rotary mechanism in a parking lock device according to one exemplary embodiment of the present invention during an operating step.

The parking lock device 10 for a vehicle transmission GT comprises a drive shaft AW and a first actuator F1, by which the drive shaft AW can be rotated; a locking pawl 2, which can be latched into the vehicle transmission GT with a locking effect; a rotary mechanism 1, which is connected to the drive shaft AW and comprises a latching mechanism, an engagement spring 16 and a permanent magnet PM, wherein the locking pawl 2 and the rotary mechanism 1 can be moved with the permanent magnet PM between a locking position (not shown) and a neutral position nP for the vehicle transmission GT, wherein the rotary mechanism 1 can be preloaded by means of the engagement spring 16 and, in the process, the neutral position nP can be adopted. In FIG. 1, the rotary mechanism 1 and the locking pawl 2 are in the neutral position nP, no locking effect is active, i.e. the latter is inactive.

The locking pawl 2 can be preloaded by means of a pawl spring 3 and can be mounted rotatably on a bolt 4 and can face a section of a parking lock wheel 5 in a transmission housing 6. Advantageously, the position sensor PS can also be mounted in the transmission housing 6 in a detection region EB toward the movement region of the permanent magnet PM, which can detect the state of the parking lock mechanism as "engaged P" or "disengaged nP".

The second actuator F2, by which, when the engagement spring 16 is preloaded, the latching mechanism can be triggered and, as a result, the locking position P can be engaged by a force effect of the engagement spring 16 on the rotary mechanism 1, can comprise a solenoid for triggering the latching mechanism with its latching pawl 17. For this purpose, the solenoid of the second actuator F2 can comprise and move an armature pin 21, which can counteract the effect of a latching spring 18, which can push the latching pawl 17 to latch in, and can release the latching mechanism from an anchorage.

There is advantageously a control device SE, which is connected to the position sensor PS and to the first actuator F1 and to the second actuator F2, and which is configured to control operation of the first actuator F1 and/or of the second actuator F2, advantageously as a function of a command from a user.

The rotary mechanism 1 can consist substantially of four disks, wherein the ratchet disk 9 can be fixedly connected to the drive shaft AW, and the other disks, in the form of magnetic disk 11, engagement spring disk 12, and cam disk 13, can be mounted rotatably on the drive shaft AW. In order to minimize friction, the cam disk 13 can be embodied with a roller 14, which can be arranged movably on the locking pawl 2. In this arrangement, the roller 14 can be arranged on an arm of the cam disk 13 which, depending on the position of the cam disk 13, can push the locking pawl 2 counter to a force direction of the pawl spring 3. The first actuator F1 is, for example, an electric motor and is shown only symbolically by an arrow and can be connected to the drive shaft AW for conjoint rotation therewith.

The cam spring 15 for producing a preload can be installed and fastened between the cam disk 13 and the magnetic disk 11, for example by means of bolts on the respective disks, and can be placed around the drive shaft, such that the two disks, the cam disk 13 and the magnetic disk 11, can be supported on one another at a first stop A1, that is to say can produce a force effect toward one another, with the cam spring applied and thus loaded. A deflection of the two disks, with the result that their contact would move away from the first stop A1, could load the cam spring further and increase the force effect toward one another again. The first stop A1 can comprise, for example, a flange on the magnetic disk 11, and the cam disk 13 can comprise an extension arm which can press against this flange of the magnetic disk when it is rotated about the drive shaft AW.

The engagement spring 16 can be fastened in a similar manner between the ratchet disk 9 and the engagement spring disk 12, for example by means of bolts on the two disks, and can wind around the drive shaft AW, once or several times. In the neutral position nP, the engagement spring 16 can be preloaded and can trigger a force in the direction of rotation, counterclockwise for instance, on the rotary mechanism 1. In this case, the preloading can act between the ratchet disk 9 and the engagement spring disk 12. The engagement spring disk 12 can also be supported on the magnetic disk 11 at a second stop A2, which can be formed as a flange on the magnetic disk 11, and can exert a torque on the magnetic disk 11, wherein the magnetic disk can be supported on the latching pawl 17 in its latched state on a projection of the magnetic disk. Thus, prior to the engagement of the locking effect, a frictional connection in the rotary mechanism 1 is closed by the latched latching pawl 17. The permanent magnet PM can comprise a north pole and a south pole N-S.

The second actuator F2 can be fastened in the housing 6 of the vehicle transmission and can be connected to the control device SE via a plug 20.

Thus, a moment of the pawl spring 3 can be transmitted via the cam disk 13 and the cam spring 15 to the magnetic disk 11 and via the second stop A2 to the engagement spring 16 and subsequently to the first stop A5, which is fixed to the housing, the rotary mechanism, when the engagement spring 16 is preloaded, being supported on the first stop A5, which is fixed to the housing, in the neutral position nP and thus being held in a stable position, which the position sensor PS can also detect as such.

FIGS. 1 to 10 show successive steps.

Figure 2:
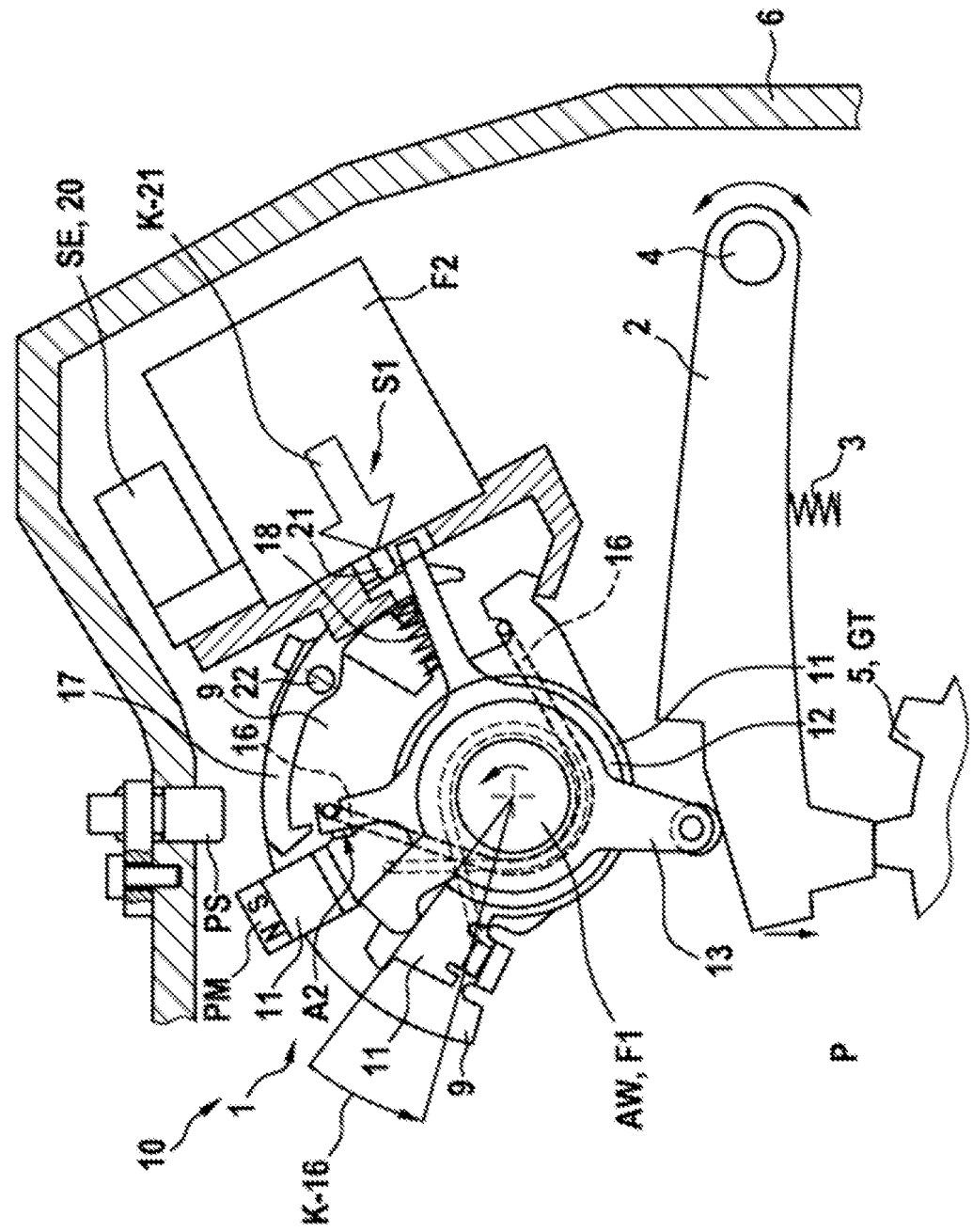

FIG. 2 shows a schematic illustration of a rotary mechanism in a parking lock device according to one exemplary embodiment of the present invention during a further operating step.

In order to transfer the locking pawl 2 and the rotary mechanism 1 from the neutral position nP, as shown in FIG. 1, into the locking position P, the second actuator F2 can be supplied with current by the control unit SE via its plug 20, wherein a force K-21 can then be exerted on the latching pawl 17 via the armature pin 21 and the latching mechanism can disengage from the magnetic disk 11. This force rotates the latching pawl 17 about the bolt 22 and, by means of the rotary movement, the latching pawl releases the magnetic disk 11, while the ratchet disk 9 need not move during this process. As a result of the preloaded engagement spring 16 and via the second stop A2, the magnetic disk 11 can now be rotated (counterclockwise for instance) and the cam disk 13 can be rotated (to the left) at the same time as a result of the cam spring load, and the cam disk 13 pushes the locking pawl 2 downward into the gear mechanism. The engagement spring 16 and the cam spring 15 can be wound around the drive shaft and rest directly against the latter.

If a tooth of the locking pawl 2 does not enter a gap in the parking lock wheel 5, but strikes a tooth instead, the movement of the locking pawl 2 and thus of the cam disk 13 can also be stopped. However, by means of a higher force K-16 of the engagement spring 16, the magnetic disk 11 can nevertheless be rotated into its locking position P and, at the same time, the cam spring 15 is loaded. In this process, the permanent magnet PM, like the magnetic disk 11, may have reached its locking position P, and thus the position sensor PS transmits the signal P to the control unit SE. If the vehicle moves very slightly, the parking lock wheel 5 rotates. By means of the loaded cam spring 15, the cam disk and the locking pawl 2 are pushed into the next tooth gap of the parking lock wheel 5 counter to the pawl spring 3. Since the position of the permanent magnet PM can remain unchanged, signal P continues to be transmitted to the control unit.

In the case where the control device SE detects an electrical fault of the second actuator F2, for instance due to a cable break, short circuit in the winding or other factors, the engagement of the parking lock can alternatively also be effected by the first actuator F2. The latter can trigger the latching mechanism or preferably rotate the ratchet disk 9, the magnetic disk 11 and the cam disk 13 together with the drive shaft and push down the locking pawl 2. If a tooth-on-tooth position should occur again, the cam spring 15 is loaded in this case too and, after a short vehicle movement, engages the locking pawl 2, or, in the case of a tooth-gap position, the engagement of the parking lock takes place immediately. There is thus redundancy for engagement.

Since the engagement spring 16 is now relaxed after reaching the locking position P, the engagement spring 16 must be loaded again before the next engagement, as shown in the following figures. The loading of the engagement spring can advantageously take place in position P, that is to say the routine of spring loading can take place immediately after the engagement of the parking lock.

Figure 3:
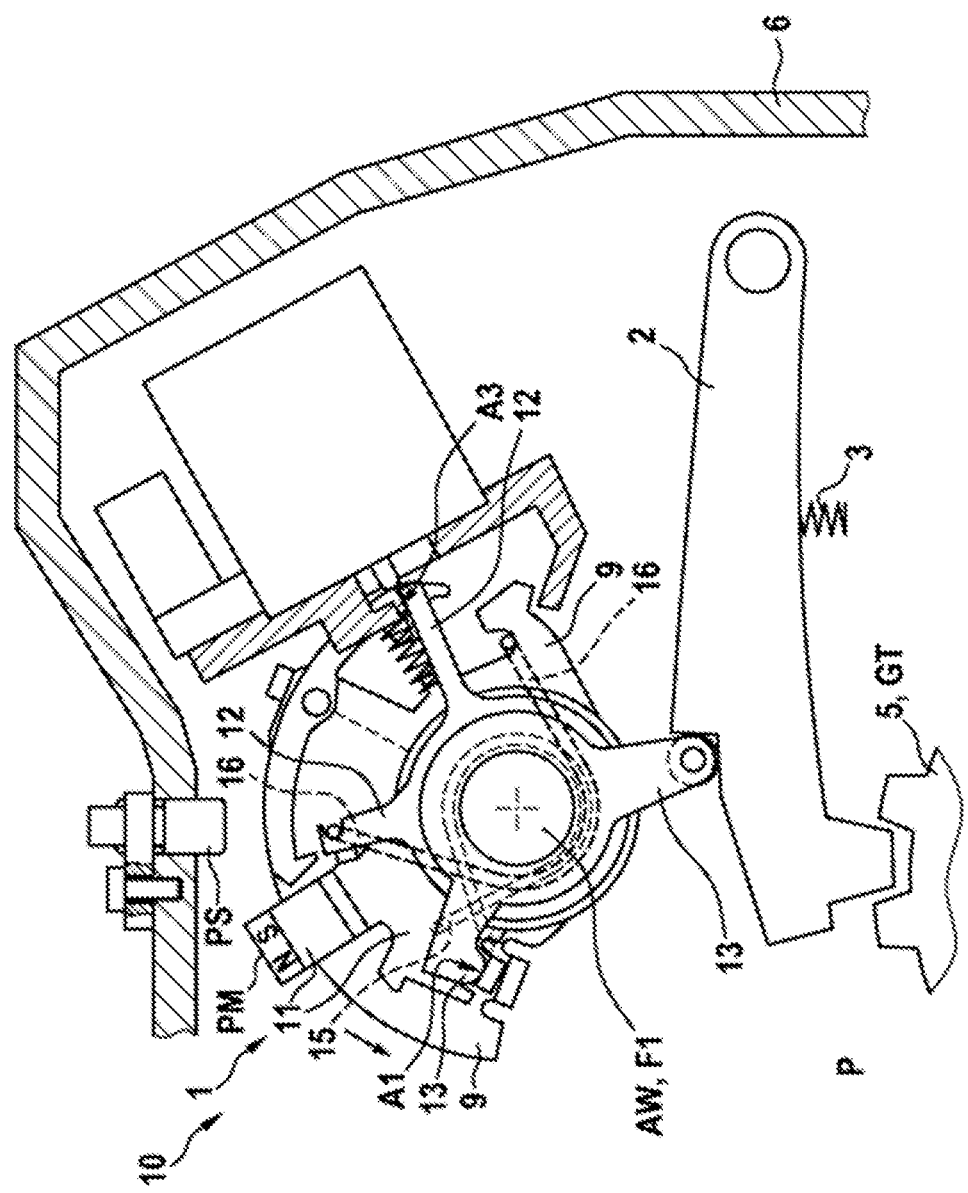

FIG. 3 shows a schematic illustration of a rotary mechanism in a parking lock device according to one exemplary embodiment of the present invention during a further operating step.

FIG. 3 shows the rotary mechanism 1 of FIG. 1 and FIG. 2 in a first step of the loading routine. The first actuator can rotate the ratchet disk 9 (counterclockwise) via the drive shaft AW, and the engagement spring disk 12 can then be rotated at the same time via the engagement spring 16 until the engagement spring disk reaches the second stop A3 fixed to the housing, as a result of which a left leg of the engagement spring 16 can thus be locked.

Figure 4:
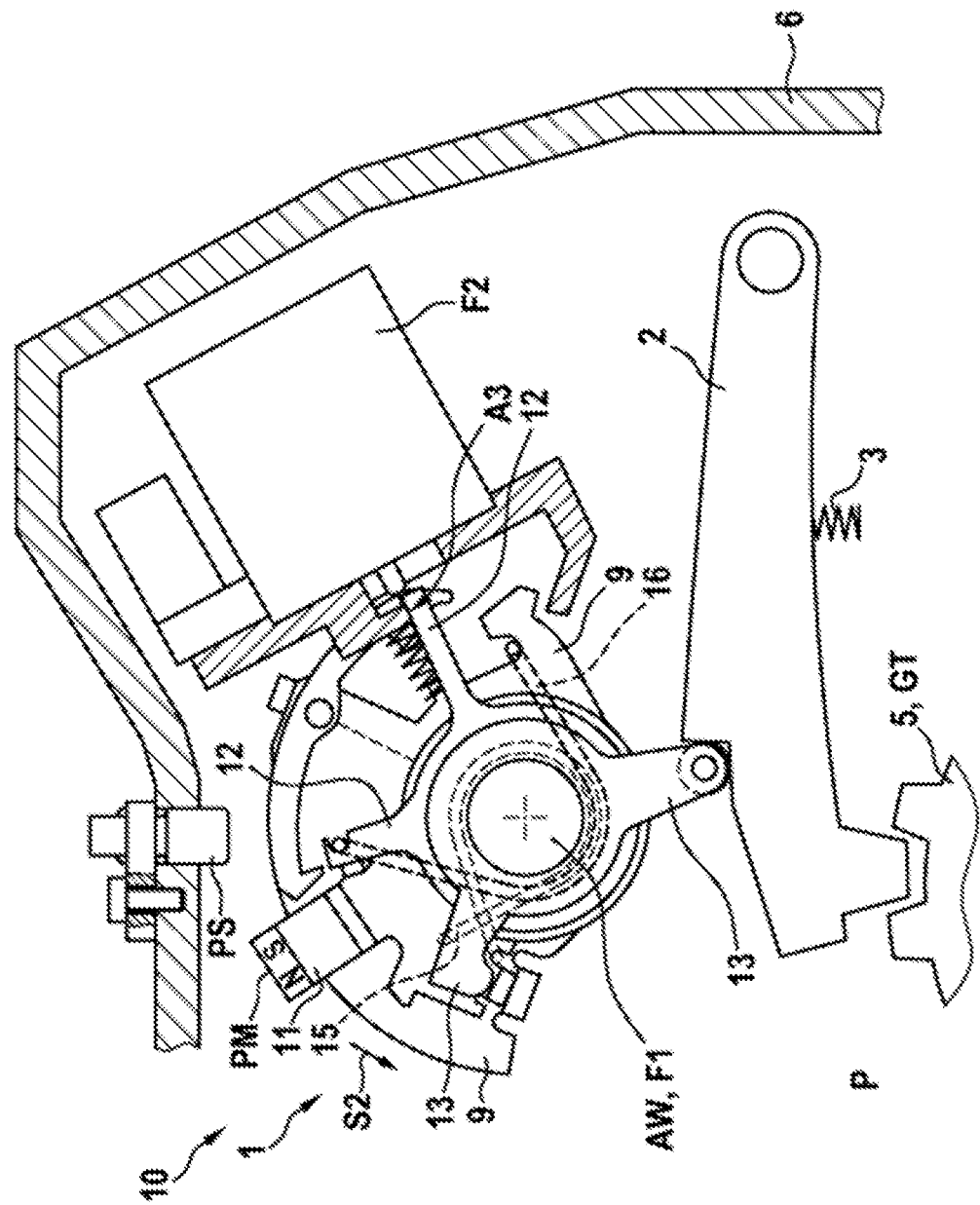

FIG. 4 shows a schematic illustration of a rotary mechanism in a parking lock device according to one exemplary embodiment of the present invention during a further operating step.

Subsequently to the rotational position of FIG. 3, when the second stop A3 fixed to the housing is reached, the first actuator F1 can rotate the ratchet disk 9 further (in the same direction as before, i.e. counterclockwise here) (further loading).

Figure 5:
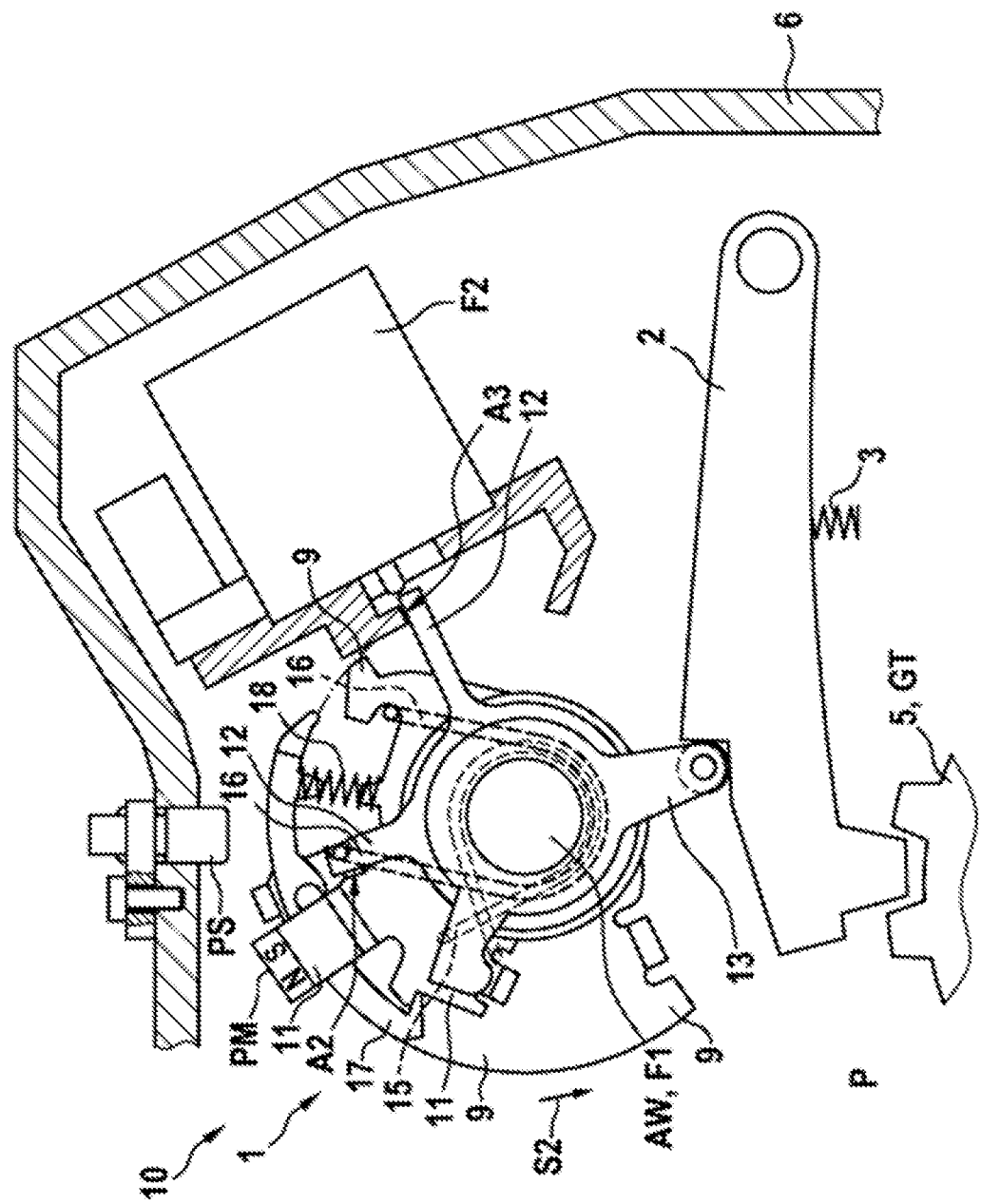

FIG. 5 shows a schematic illustration of a rotary mechanism in a parking lock device according to one exemplary embodiment of the present invention during a further operating step.

After the further rotation from FIG. 4, the engagement spring 16 can then be loaded even further and the latching pawl 17 can again engage in the magnetic disk 11, i.e. the latching spring 18 can again push the latching pawl 17 into engagement. The engagement spring 16 is now loaded and latching is restored. However, there is not necessarily any information as to whether this state has been reached. Therefore, the first actuator can rotate the ratchet disk 9 further (counterclockwise), for instance in the same direction.

Figure 6:
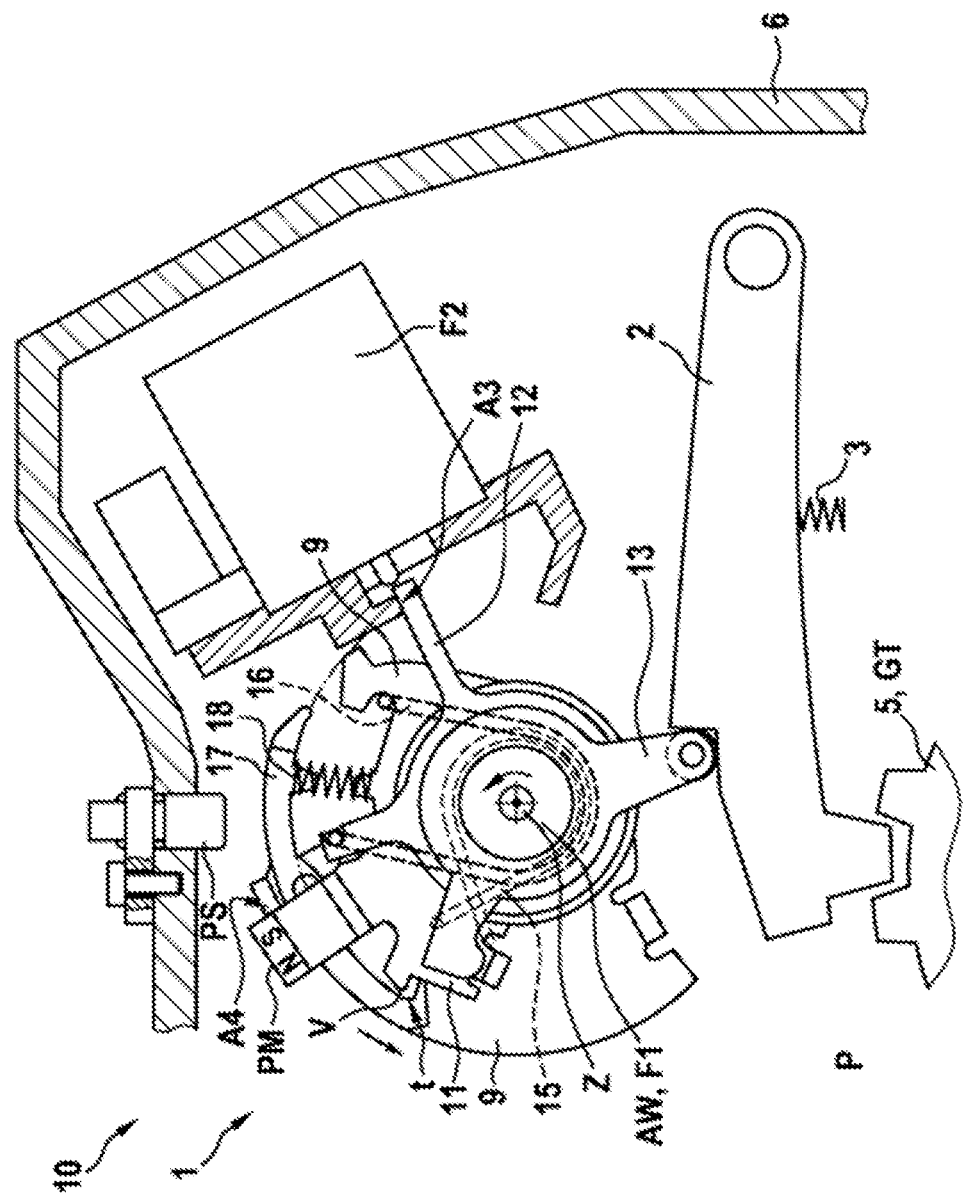

FIG. 6 shows a schematic illustration of a rotary mechanism in a parking lock device according to one exemplary embodiment of the present invention during a further operating step.

FIG. 6 shows the further rotation of the ratchet disk 9 (counterclockwise in the loading direction), as already mentioned in FIG. 5. During this process, a clearance t can form between the latched latching pawl 17 and the projection V on the magnetic disk 11. A clearance t forms in the latching, but the latching spring 18 keeps the latching pawl 17 in its position P. The ratchet disk 9 can now reach the magnetic disk 11 at the third stop A4, which can be formed on the magnetic disk 11. The third stop A4 can now exert a further force on the magnetic disk 11 in the direction of rotation (arrow on A4) and take it along in rotation.

FIG. 6 also shows a direction z of extent on the drive shaft AW. The disks and springs can be arranged along this at different levels, in a vertically offset manner. This exact arrangement along z can be selected differently depending on the design and the construction specification.

Figure 7:
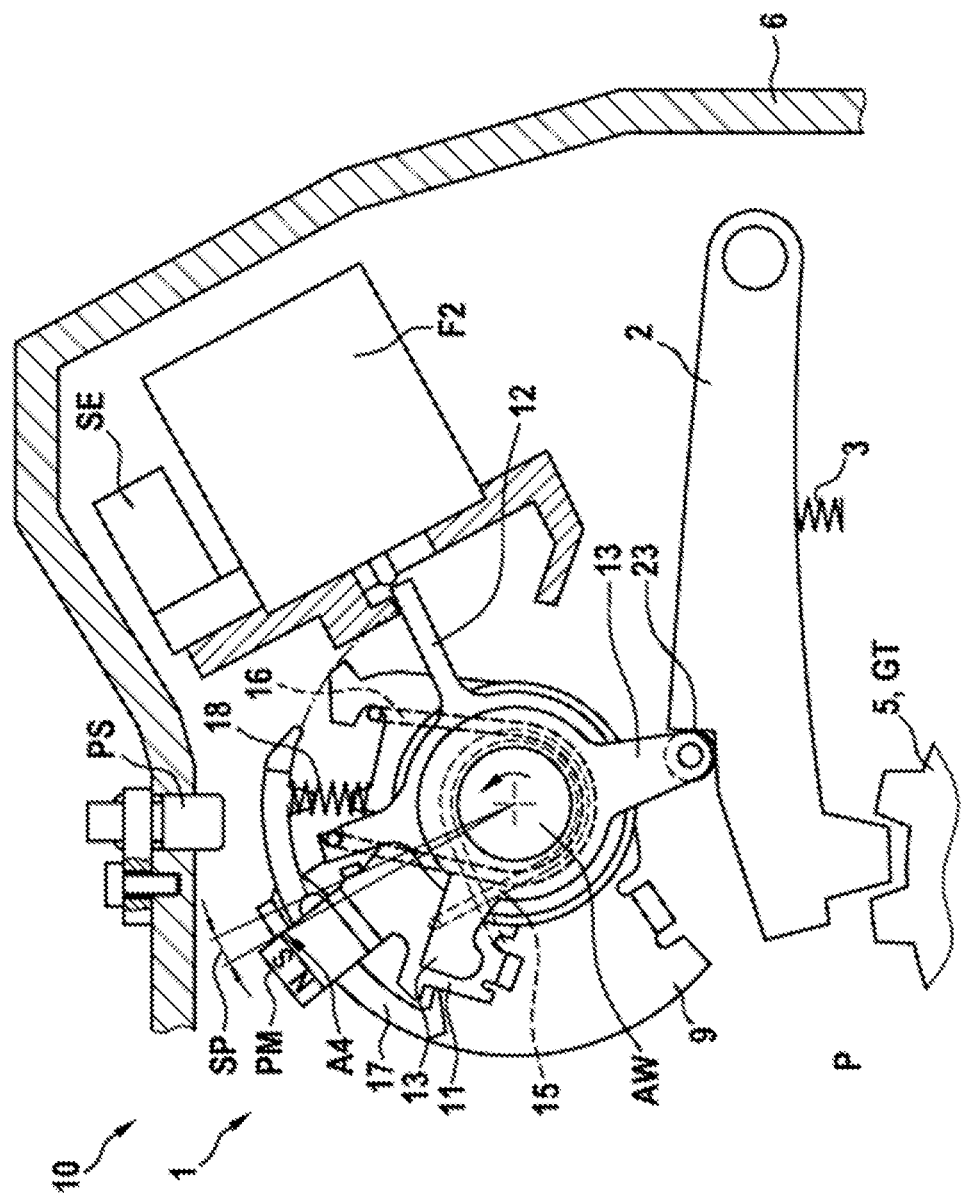

FIG. 7 shows a schematic illustration of a rotary mechanism in a parking lock device according to one exemplary embodiment of the present invention during a further operating step.

After reaching the third stop A4 according to FIG. 6, the ratchet disk 9 can now take along the magnetic disk 11 in the direction of rotation, and now further load the engagement spring 16 until a loading position SP can be reached.

In the process, the permanent magnet PM continues to change its position, the locking pawl 2 remains in position P. This signal can now be recognized in the control device SE as a "spring loaded" signal, which can be in the loading position. The additional angle of rotation for recognizing "spring loaded" also leads to further loading of the cam spring 15, since the cam 13 can be locked against the locking pawl stop 23 on the locking pawl 2 in the locking position P.

After the "spring loaded" signal, this value can be stored in the control device and the control device can be switched off.

Figure 8:
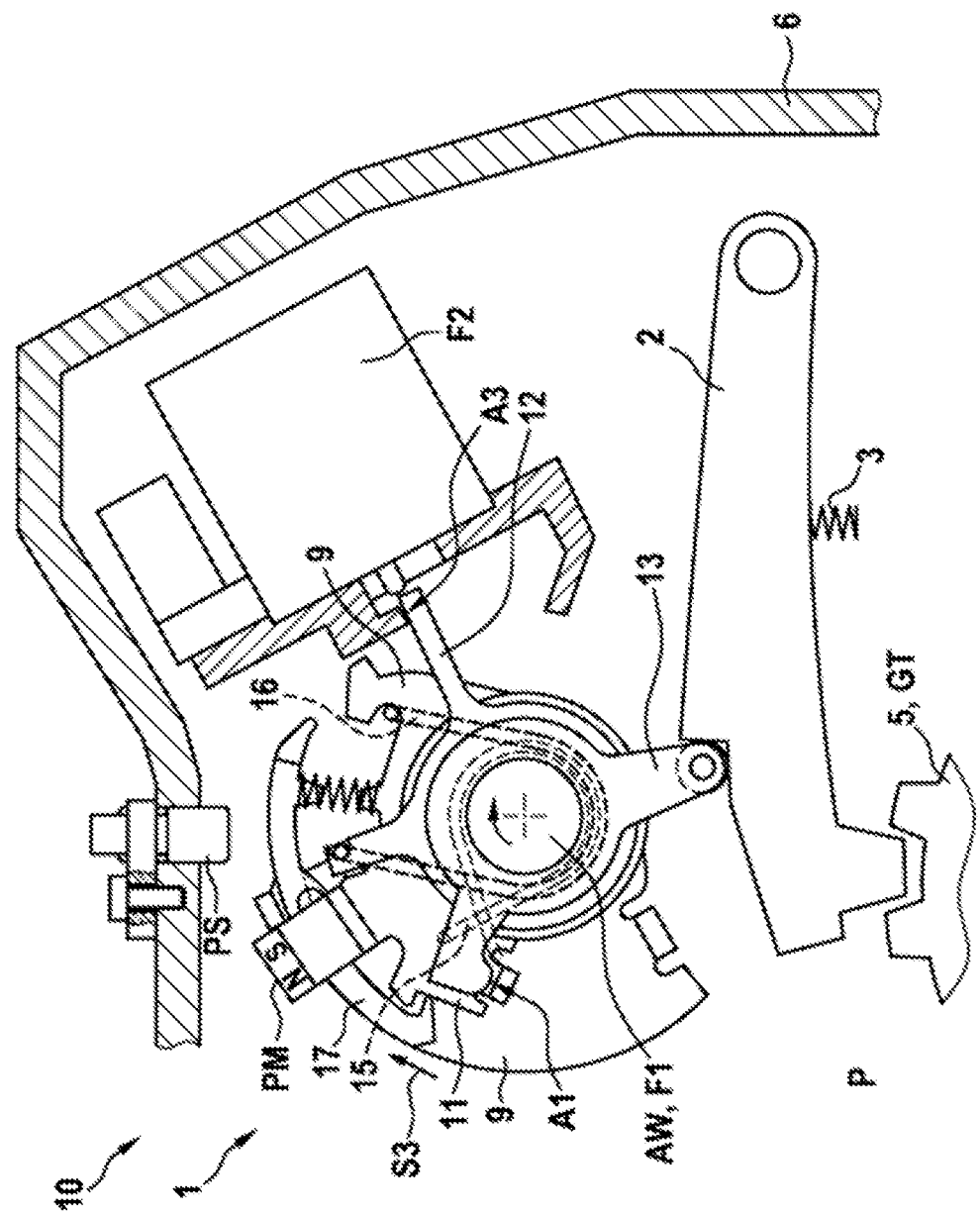

FIG. 8 shows a schematic illustration of a rotary mechanism in a parking lock device according to one exemplary embodiment of the present invention during a further operating step.

Following on from the position in FIG. 7, for example also when the vehicle is restarted, a rotation in the opposite direction to the loading movement of FIGS. 1 to 7 (that is to say now in the clockwise direction) can take place again. Here, the control device can read the status "spring loaded" in the memory and can then actuate the first actuator F1 for a movement of the rotary mechanism in the direction of rotation counter to the loading movement (for example to the right or clockwise).

The first actuator F1 thus rotates the drive shaft AW back with the ratchet disk 9, for instance. During this process, the second stop A2 can be reached first, and the cam spring 15 can then assume its normal preload again, as in FIG. 9. The position sensor PS can record the reverse rotation and the position P.

FIG. 9 shows a schematic illustration of a rotary mechanism in a parking lock device according to one exemplary embodiment of the present invention during a further operating step.

After the position in FIG. 8, during further clockwise rotation in FIG. 9, the latching pawl 17 of the ratchet disk 9 can again reach the magnetic disk 11 and secure a latching of these disks, wherein the magnetic disk 11 can strike the second stop A2 with the engagement disk 12.

FIG. 10 shows a schematic illustration of a rotary mechanism in a parking lock device according to one exemplary embodiment of the present invention during a further operating step.

In a subsequent step to FIG. 9, after a further rotation of the rotary mechanism 1 with transmission of the torque via the second stop A2 in the clockwise direction, the rotary mechanism can again strike the first housing stop A5 with the ratchet disk 9. Since, as a result of its latching, the latching pawl 17 takes the magnetic disk 11 along and the latter takes the cam disk 13 along via the first stop A1, the cam disk 13 can be rotated or moved to the left on the locking pawl 2, or at least so as to release the locking pawl 2 with its cam arm, and the neutral position nP can be reached, the parking lock being disengaged. This position can be detected by the position sensor PS from the position of the permanent magnet PM and can be passed on to the control device SE and stored. The vehicle can then drive away.

The arrangement of the disks in the rotary mechanism which is illustrated by FIGS. 1 to 10 is only one exemplary embodiment; these disks can also be arranged differently relative to one another and the respective stops can also act differently on the disks as long as the basic rotary concept for the transmission of force of the loading effect and for the engagement and disengagement of the locking effect can be achieved in accordance with the claims. The arrangement of the disks, stops and springs can be selected differently in detail, depending on the installation space, reasons connected with assembly or other reasons.

Although the present invention has been fully described above with reference to the preferred exemplary embodiment, it is not restricted thereto but can be modified in a variety of ways.

The invention claimed is:

1. A parking lock device (10) for a vehicle transmission (GT), comprising:
    a drive shaft (AW) and a first actuator (F1), by which the drive shaft (AW) can be rotated;
    a locking pawl (2), which can be latched into the vehicle transmission (GT) with a locking effect;
    a rotary mechanism (1), which is connected to the drive shaft (AW) and comprises a latching mechanism (17, 18), an engagement spring (16) and a permanent magnet (PM), wherein the locking pawl (2) and the rotary mechanism (1) can be moved with the permanent magnet (PM) between a locking position (P) and a neutral position (nP) for the vehicle transmission (GT), wherein the rotary mechanism (1) can be preloaded by the engagement spring (16) and, as a result, the neutral position (nP) can be adopted; wherein the parking lock device (10) further comprises:
    a second actuator (F2), by which the latching mechanism can be triggered when the engagement spring (16) is preloaded and, as a result, the locking position (P) can be selected by a force effect of the engagement spring (16) on the rotary mechanism (1), wherein, when the engagement spring (16) is preloaded, the rotary mechanism (1) can be held in the neutral position (nP) by the engaged latching mechanism, and wherein the first actuator is furthermore designed to move the rotary mechanism (1) and thereby load the engagement spring (16) again and, after that, to move the rotary mechanism (1) into the neutral position (nP);
    a position sensor (PS), which is arranged in a detection region (EB) of the permanent magnet (PM), wherein the position sensor (PS) is configured to detect a movement of the permanent magnet (PM) relative to the position sensor (PS) and thereby to ascertain whether the locking pawl (2) is in the locking position (P) or in the neutral position (nP) on account of the rotary mechanism (1); and
    a control device (SE), which is connected to the position sensor (PS) and to the first actuator (F1) and to the second actuator (F2), and which is configured to control operation of the first actuator (F1) and/or the second actuator (F2).

2. The parking lock device (10) as claimed in claim 1, wherein the rotary mechanism (1) further comprises:
    a ratchet disk (9), which is connected to the drive shaft (AW) for conjoint rotation therewith,
    a magnetic disk (11) with the permanent magnet (PM),
    an engagement spring disk (12), which is connected to the engagement spring (16), and
    a cam disk (13), wherein the magnetic disk (11), the engagement spring disk (12) and the cam disk (13) are arranged and supported rotatably on the drive shaft (AW), wherein the magnetic disk (11), the engagement spring disk (12), the cam disk (13) and/or the ratchet disk (9) comprise stop regions (A1, A2, A4), by which a torque can be transmitted via the rotary mechanism (1), wherein the locking pawl (2) rests on the cam disk (13) and, depending on a position of the cam disk (13), the locking pawl (2) is in the locking position (P) or in the neutral position (nP) for the vehicle transmission (GT).

3. The parking lock device (10) as claimed in claim 2, in which the rotary mechanism (1) comprises a cam spring (15), by which the torque can be transmitted within the rotary mechanism (1).

4. The parking lock device (10) as claimed in claim 1, in which the position sensor (PS) is configured to detect a magnetic field characteristic during the movement of the permanent magnet (PM).

5. The parking lock device (10) as claimed in claim 1, in which the first actuator (F1) comprises an electric motor and the second actuator comprises a solenoid.

6. The parking lock device (10) as claimed in claim 1, in which the rotary mechanism (1) is designed to engage with at least one further stop region (A3, A5) of a housing (6) of the vehicle transmission (GT) in order to transmit a torque via the rotary mechanism (1).

7. The parking lock device (10) as claimed in claim 1, in which the control device (SE) is configured to detect an error function of the second actuator (F2) and to actuate the first actuator (F1) to trigger the latching mechanism or the first actuator (F1) to rotate the drive shaft (AW) and thus to select the locking position (P).

8. The parking lock device (10) as claimed in claim 1, in which the rotary mechanism (1) is designed in such a way that, when the rotary mechanism (1) is moved in order to load the engagement spring (16) again and the rotary mechanism (1) is subsequently moved into the neutral position (nP), the locking pawl (2) maintains a locking effect until the neutral position (nP) is reached.

9. The parking lock device (10) as claimed in claim 1, which comprises an emergency power supply, to which the first actuator and/or the second actuator are/is connected.

10. A method for operating a parking lock device (10) as claimed in claim 1, comprising the steps of:
    triggering (S1) of the latching mechanism by the second actuator (F2) or by the first actuator (F1) in the event of a malfunction of the second actuator (F2) and thereby engagement of the locking position (P) by a force effect of the engagement spring (16) or rotation of the drive shaft (AW) by the first actuator and thereby engagement of the locking position (P) by the first actuator (F1) in the event of the malfunction of the second actuator (F2);
    renewed loading (S2) of the engagement spring (16) by rotation of the rotary mechanism (1) by the first actuator (F1) during the locking position (P) and engagement of the latching mechanism;
    movement (S3) of the rotary mechanism (1) back into the neutral position (nP) by the first actuator (F1), wherein the position sensor (PS) detects a movement of the permanent magnet (PM) relative to the position sensor (PS) and ascertains whether the locking pawl (2) is in the locking position (P) or in the neutral position (nP) on account of the rotary mechanism (1).

11. A method as claimed in claim 10, in which the second actuator performs a stroke and thus releases the latching mechanism and enables rotation of the rotary mechanism (1) by the force effect of the preloaded engagement spring (16) and, as a result, the locking position (P) is engaged.

12. The method as claimed in claim 10, wherein, in order to load the engagement spring (16), the rotary mechanism (1) is rotated as far as a loading position (SP), which is detected by the position sensor (PS).

\* \* \* \* \*